No. 834,963. PATENTED NOV. 6, 1906.
F. C. BROCK & A. M. SCHAFFER.
TIRE COVER.
APPLICATION FILED JULY 2, 1906.

Witnesses
Carl Stoughton
F. G. Campbell

Inventors
Frederick C. Brock
Arthur M. Schaffer
By Shepherd & Parker
Attorneys

UNITED STATES PATENT OFFICE.

FREDERICK C. BROCK AND ARTHUR M. SCHAFFER, OF COLUMBUS, OHIO, ASSIGNORS TO THE VEHICLE APRON & HOOD COMPANY, OF COLUMBUS, OHIO, A CORPORATION OF OHIO.

TIRE-COVER.

No. 834,963.     Specification of Letters Patent.     Patented Nov. 6, 1906.

Application filed July 2, 1906. Serial No. 324,383.

*To all whom it may concern:*

Be it known that we, FREDERICK C. BROCK and ARTHUR M. SCHAFFER, citizens of the United States, residing at Columbus, in the county of Franklin and State of Ohio, have invented certain new and useful Improvements in Tire-Covers, of which the following is a specification.

Our invention relates to tire-covers, and has for its object the provision of a cover adapted to receive the extra tires usually carried upon automobiles and to inclose said tires in such manner as to protect them from the dust to which they are naturally subjected during the movements of the automobile by which they are carried.

While the tire-cover forming the present invention has been illustrated as being formed of a number of pieces, it may be said that in a general way this cover consists of a casing which is adapted to be wrapped about the tire, each of the edges of said casing having an elastic fastening-strip extending therealong nearly the entire length of the cover, the ends of said elastic strips projecting beyond the end of the tire-cover at one end of said cover and being provided with rings and the opposite end of the cover being provided at each edge with hooks adapted to engage these rings.

Figure 1:
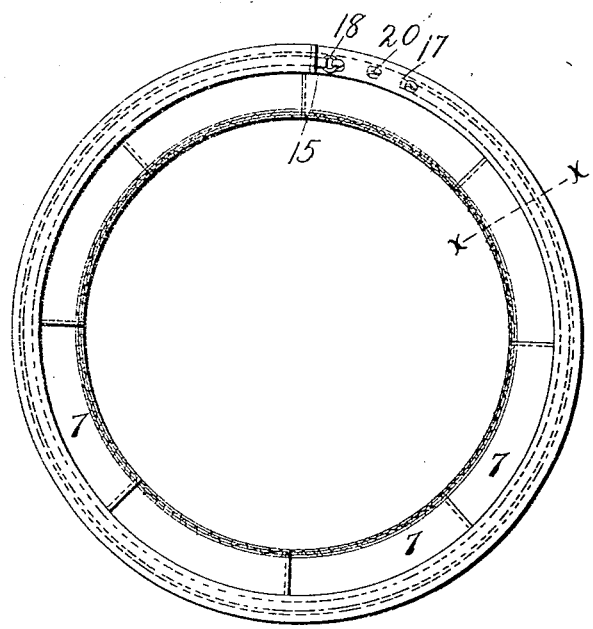
Figure 2:
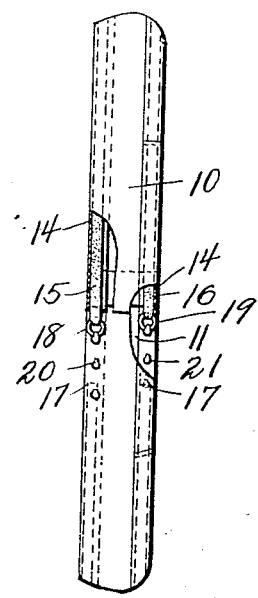
Figure 3:
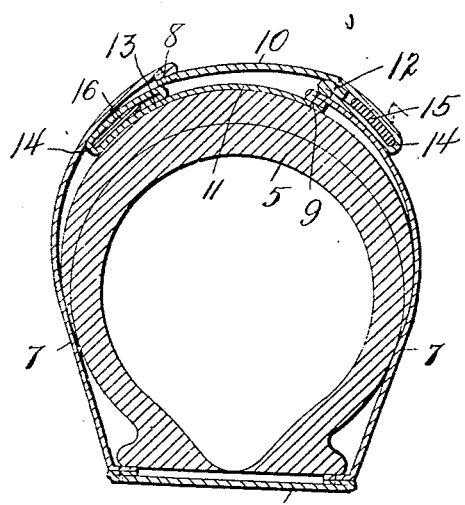
Figure 4:
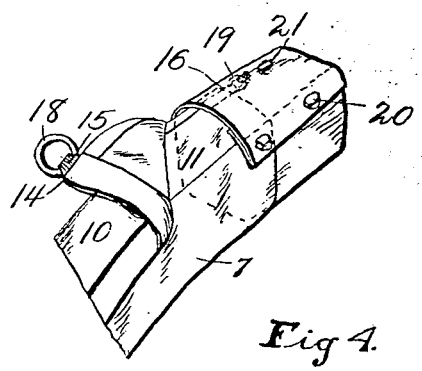

In the accompanying drawings, Figure 1 is a side elevation of a tire-cover constructed in accordance with the invention and illustrating said cover as it appears when secured upon a tire. Fig. 2 is a plan view of the parts shown in Fig. 1 with portions of the cover broken away. Fig. 3 is a transverse vertical section, upon an enlarged scale, of a tire-cover and the tire which it incloses; and Fig. 4 is a detail perspective view illustrating a portion of the cover adjacent its ends.

Like numerals designate corresponding parts in all of the figures of the drawings.

Referring to the drawings, the numeral 5 designates the tire which is inclosed by the tire-cover comprising the present invention. This tire-cover comprises an inner annular strip 6. Secured to this strip at its edges are a plurality of segments 7, which cover the sides of the tire. Stitched to these segments at 8 and 9 are flaps 10 and 11, the edges of these flaps being turned over and stitched, as at 12 and 13, to form pockets 14 for the reception of elastic strips 15 and 16. These strips extend around the tire along the edges of the flaps 10 and 11 and through the pockets 14, one end of said elastic strips 15 and 16 terminating, as at 17, and being fastened there to the walls of the pockets 14. The opposite ends of said strips are provided with rings 18 and 19. The opposite ends of the cover are provided along its edges with hooks 20 and 21, with which these rings are adapted to engage. In securing this cover in position the elastic strip 16 is first extended about the tire, and the rings 19 are then engaged over the hooks 21. The cover is then wrapped about the tire, as shown in Figs. 3 and 4, until the flap 10 overlies the flap 11 and the strip 15 lies upon the opposite side of the tire 5 from the strip 16. The ring 18 is then engaged over the hook 20. This construction provides a simple and efficient tire-cover which will retain its position until the rings are disengaged from the hooks. It effectively protects the tire from dust or moisture and may be very cheaply made.

From the foregoing description it will be seen that simple and efficient means are herein provided for accomplishing the objects of the invention, but while the elements shown and described are well adapted to serve the purposes for which they are intended it is to be understood that the invention is not limited to the precise construction set forth, but includes within its purview such changes as may be made within the scope of the appended claims.

What we claim is—

1. A tire-cover having elastic strips extending along each of its edges and terminating at one end of said cover, rings carried by the ends of said elastic strips and hooks secured to each edge of the opposite end of the cover and adapted to be engaged by said rings.

2. A tire-cover comprising a body portion, elastic strips extending along the edges of said body portion and terminating at one end of the cover, fastening devices carried by said elastic strips and adapted to engage fastening devices carried upon the opposite ends of the tire-cover.

3. A tire-cover comprising an annular web, annular side flaps secured to said web, flaps secured to the free edges of said side flaps one of which overlaps the other, elastic strips extending along the edges of said flaps, fastening devices carried by the edges of said flaps adjacent one end thereof, and fastening devices secured to one end of the elastic strips which are adapted to engage said first-named fastening devices.

In testimony whereof we affix our signatures in presence of two witnesses.

FREDERICK C. BROCK.
ARTHUR M. SCHAFFER.

Witnesses:
A. L. PHELPS,
C. C. SHEPHERD.